(12) United States Patent
Lawless et al.

(10) Patent No.: US 11,639,027 B2
(45) Date of Patent: May 2, 2023

(54) SYSTEMS, APPARATUS, AND METHODS FOR CURING OF A PHOTOPOLYMER VIA LATERAL VACUUM RELEASE DURING AN ADDITIVE MANUFACTURING PROCESS

(71) Applicant: CALT Dynamics Limited, County Wicklow (IE)

(72) Inventors: Ross Lawless, Newtownmountkennedy (IE); Irene Villafane, Newtownmountkennedy (IE)

(73) Assignee: CALT DYNAMICS LIMITED, County Wicklow (IE)

( * ) Notice: Subject to any disclaimer, the term of this patent is extended or adjusted under 35 U.S.C. 154(b) by 38 days.

(21) Appl. No.: 17/174,546

(22) Filed: Feb. 12, 2021

(65) Prior Publication Data

US 2021/0260818 A1      Aug. 26, 2021

Related U.S. Application Data

(60) Provisional application No. 62/979,766, filed on Feb. 21, 2020, provisional application No. 62/979,747, filed on Feb. 21, 2020.

(51) Int. Cl.
*B29C 64/129* (2017.01)
*B29C 64/188* (2017.01)
(Continued)

(52) U.S. Cl.
CPC ........ *B29C 64/129* (2017.08); *B29C 37/0067* (2013.01); *B29C 64/188* (2017.08);
(Continued)

(58) Field of Classification Search
CPC ............... B29C 64/124; B29C 64/106; B29C 37/0075; B29C 37/0067; B29C 33/44
See application file for complete search history.

(56) References Cited

U.S. PATENT DOCUMENTS 5,122,441 A * 6/1992 Lawton ................. B29C 64/129
430/394
5,447,822 A * 9/1995 Hull ....................... B29C 64/135
430/269

(Continued)

FOREIGN PATENT DOCUMENTS

EP       3058610 B1     9/2016
EP       3107703 A1     12/2016
(Continued)

OTHER PUBLICATIONS

International Search Report and Written Opinion for International Application No. PCT/IB2021/051388 dated Jun. 18, 2021; 13 pgs.

*Primary Examiner* — Atul P. Khare
(74) *Attorney, Agent, or Firm* — Cantor Colburn LLP

(57) ABSTRACT

A system and method for continuous additive manufacturing of objects is provided. The system includes a container configured to receive a photopolymer and a print bed disposed within the container. An first end effector is movably disposed within the container. A light source is operably coupled to the first end effector, the light source being configured to emit and electromagnetic radiation. Wherein at least one of the print bed or first end effector is movable relative to the other to perform continuous separation curing of the photopolymer on the print bed with the electromagnetic radiation.

19 Claims, 16 Drawing Sheets

(51) Int. Cl.
  *B29C 64/245* (2017.01)
  *B29C 64/236* (2017.01)
  *B29C 64/364* (2017.01)
  *B29C 64/268* (2017.01)
  *B33Y 10/00* (2015.01)
  *B33Y 30/00* (2015.01)
  *B33Y 40/20* (2020.01)
  *B29C 37/00* (2006.01)
  *B29C 64/30* (2017.01)

(52) U.S. Cl.
  CPC .......... *B29C 64/236* (2017.08); *B29C 64/245* (2017.08); *B29C 64/268* (2017.08); *B29C 64/30* (2017.08); *B29C 64/364* (2017.08); *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 8,003,039 B2 | 8/2011 | Sperry et al. | |
| 8,877,115 B2* | 11/2014 | Elsey | B33Y 30/00 264/401 |
| 9,075,409 B2* | 7/2015 | El-Siblani | B29C 64/264 |
| 9,840,045 B2* | 12/2017 | Linnell | B33Y 30/00 |
| 9,981,425 B2* | 5/2018 | El-Siblani | B29C 64/264 |
| 10,000,023 B2* | 6/2018 | El-Siblani | B29C 64/135 |
| 10,118,343 B1* | 11/2018 | Linnell | B29C 64/245 |
| 10,144,205 B2* | 12/2018 | El-Siblani | B29C 64/241 |
| 10,675,856 B2 | 6/2020 | Frantzdale | |
| 10,710,303 B2 | 7/2020 | Broady et al. | |
| 10,792,859 B2* | 10/2020 | Van Esbroeck | B33Y 10/00 |
| 10,882,247 B2* | 1/2021 | Van Esbroeck | B29C 64/255 |
| 11,104,117 B2* | 8/2021 | El-Siblani | B29C 64/255 |
| 2011/0089610 A1* | 4/2011 | El-Siblani | B29C 64/188 425/89 |
| 2016/0185045 A1 | 6/2016 | Linnell et al. | |
| 2019/0369566 A1* | 12/2019 | Lobovsky | G01L 5/0047 |
| 2021/0260819 A1 | 8/2021 | Lawless et al. | |
| 2021/0291436 A1 | 9/2021 | Lawless et al. | |
| 2021/0339464 A1 | 11/2021 | Lawless et al. | |
| 2022/0152917 A1 | 5/2022 | Lawless et al. | |

FOREIGN PATENT DOCUMENTS

| | | |
|---|---|---|
| EP | 3250370 A1 | 12/2017 |
| WO | 2017210298 A1 | 12/2017 |
| WO | 2019079450 A1 | 4/2019 |
| WO | 2020028192 A1 | 2/2020 |
| WO | 2020185692 A2 | 9/2020 |
| WO | 2020206053 A1 | 10/2020 |

* cited by examiner

SYSTEMS, APPARATUS, AND METHODS FOR CURING OF A PHOTOPOLYMER VIA LATERAL VACUUM RELEASE DURING AN ADDITIVE MANUFACTURING PROCESS

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

TECHNICAL FIELD

The present disclosure relates to systems, apparatus, and methods for additive manufacturing or printing of three dimensional (3D) objects, and more specifically, to additive manufacturing or 3D printing (3DP) using end effector(s) that cure a photopolymer, where the end effector(s) are partially submerged in photopolymer within a vessel within the 3D printer device.

BACKGROUND

Some types of manufacturing create physical objects by laying down or building up many thin layers of material in succession, this is sometimes referred to as "3D Printing." A 3D printer can include a container for holding a liquid polymer that can be cured to produce a 3D object. The printer can include a light source and a controller that selectively controls the light source to expose the liquid polymer to light print the successive layers of the 3D object.

While existing 3D printers are suitable for their intended purposes the need for improvement remains, particularly in providing a 3D printing device having the features described herein.

SUMMARY

In accordance with one aspect of the disclosure a system for continuous additive manufacturing of objects is provided. The system includes a container configured to receive a photopolymer and a print bed disposed within the container. An first end effector is movably disposed within the container. A light source is operably coupled to the first end effector, the light source being configured to emit and electromagnetic radiation. Wherein at least one of the print bed or first end effector is movable relative to the other to perform continuous separation curing of the photopolymer on the print bed with the electromagnetic radiation.

In addition to one or more of the features described herein, or as an alternative, further embodiments of the system may include the first end effector having a nonstick coating on an end, the end being adjacent the print bed. In addition to one or more of the features described herein, or as an alternative, further embodiments of the system may include the nonstick coating being polydimethylsiloxane. In addition to one or more of the features described herein, or as an alternative, further embodiments of the system may include the continuous separation curing being performed by lateral movement of the first end effector relative to the print bed to release or neutralize a vacuum or low pressure area formed between the print bed and the first end effector that is caused by polymer shrinkage.

In addition to one or more of the features described herein, or as an alternative, further embodiments of the system may include the lateral movement applying a constant release force. In addition to one or more of the features described herein, or as an alternative, further embodiments of the system may include the release force being less than a full layer perpendicular release force. In addition to one or more of the features described herein, or as an alternative, further embodiments of the system may include a linear motion component magnetically coupled to the end effector.

In addition to one or more of the features described herein, or as an alternative, further embodiments of the system may include an induction coil operably coupled to provide electrical power to the first end effector. In addition to one or more of the features described herein, or as an alternative, further embodiments of the system may include the first end effector being configured to receive a gas, the gas forming a barrier on an end of the first end effector adjacent the print bed. In addition to one or more of the features described herein, or as an alternative, further embodiments of the system may include the first end effector is configured to flow the gas to prevent an ingress of liquid photopolymer into a low pressure region caused by photopolymer shrinkage during curing.

In addition to one or more of the features described herein, or as an alternative, further embodiments of the system may include the print bed is stationary and the first end effector is movable in a plane parallel with the print bed and in a direction perpendicular to the print bed. In addition to one or more of the features described herein, or as an alternative, further embodiments of the system may include the first end effector being movable in a plane parallel with the print bed and the print bed moves in a direction perpendicular to the first end effector. In addition to one or more of the features described herein, or as an alternative, further embodiments of the system may include a second end effector movably disposed within the container, wherein the first end effector and second end effector are selectively movable during operation of the system.

In accordance with another aspect of the disclosure a method of continuous additive manufacturing of objects is provided. The method includes disposing an end effector adjacent a print bed in a container having a photopolymer. A light source in the end effector is activated to emit an electromagnetic radiation into an area between the end effector to cure a portion of the photopolymer in the area. The end effector laterally moved relative to the print bed to define a cured layer. The portion of the photopolymer is released as the end effector is moved laterally. One of the end effector or the print bed is moved in a direction perpendicular to an axis of the end effector when the cured layer is completed.

In addition to one or more of the features described herein, or as an alternative, further embodiments of the method may include repeating the steps of activating the light source, moving the end effector laterally, releasing the portion of the photopolymer after moving the end effector or the print bed. In addition to one or more of the features described herein, or as an alternative, further embodiments of the method may include the end effector or print bed being moved in a direction perpendicular to the axis for distance equal to or greater than a thickness of the cured layer. In addition to one or more of the features described herein, or as an alternative, further embodiments of the method may include releasing a vacuum or neutralizing a low pressure area formed by polymer shrinkage with the end effector.

In addition to one or more of the features described herein, or as an alternative, further embodiments of the method may include applying a constant release force on the print bed during a lateral movement of the end effector. In addition to one or more of the features described herein, or as an alternative, further embodiments of the method may include flowing a gas into the end effector and forming a barrier on an end of the end effector adjacent the print bed.

In addition to one or more of the features described herein, or as an alternative, further embodiments of the method may include shrinking the portion of the photopolymer when the portion is cured, and flowing the gas to prevent ingress of liquid photopolymer into a low pressure region caused by the shrinking. In addition to one or more of the features described herein, or as an alternative, further embodiments of the method may include the step of moving one of the end effector or the print bed further includes moving the end effector relative to the print bed. In addition to one or more of the features described herein, or as an alternative, further embodiments of the method may include the step of moving one of the end effector or the print bed further includes moving the print bed relative to the end effector.

BRIEF DESCRIPTION OF THE DRAWINGS

An understanding of the features of the disclosure herein may be had by reference to the appended drawings, which illustrate the method and system of the disclosure, although it will be understood that such drawings depict preferred embodiments of the disclosure and, therefore, are not to be considered as limiting its scope with regard to other embodiments which the disclosure is capable of contemplating. Furthermore, elements or components that are described with reference to any one figure may be interchanged with those of other figures without departing from the scope of the present teaching.

DETAILED DESCRIPTION

Figure 1:
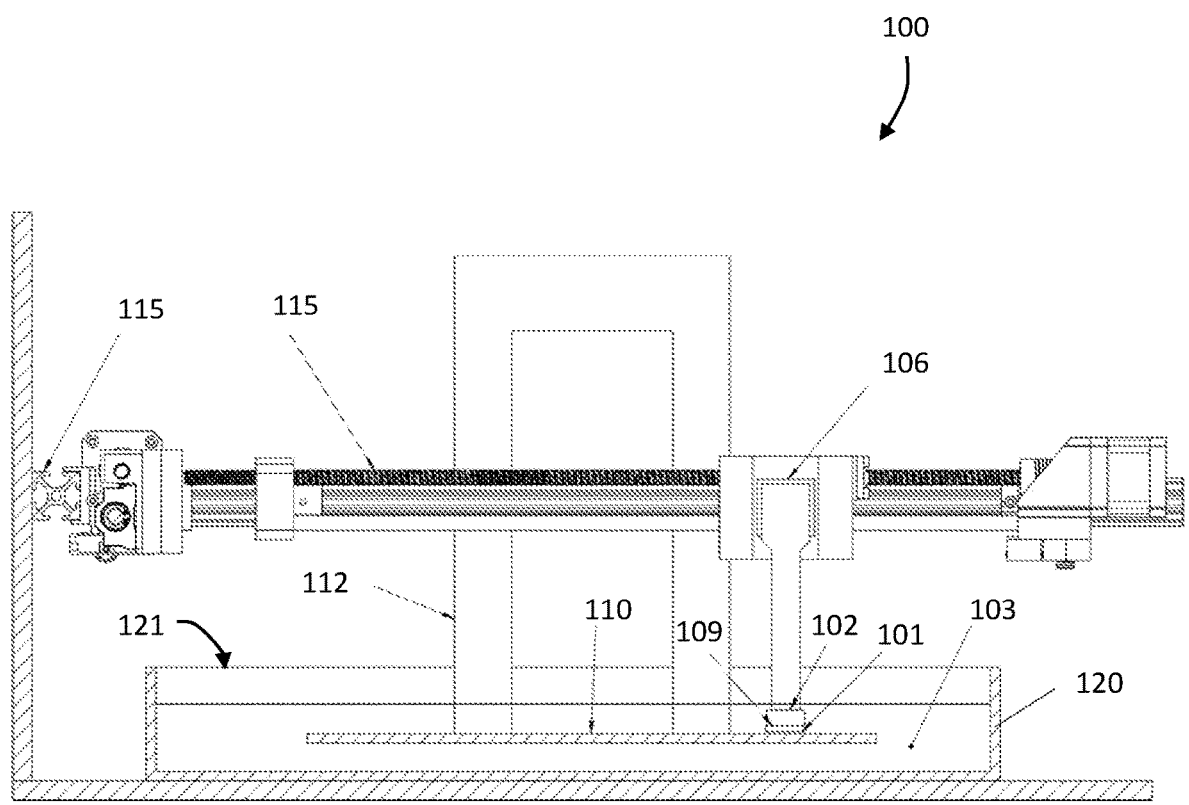
FIGS. 1, 2A, 2B, 2C and 3 depict an example of a manufacturing device implemented as a 3D printing device in accordance with an embodiment.

Systems, apparatus, and methods are described for providing an additive manufacturing process involving continuous curing of a photopolymer via continuous lateral vacuum release. In some embodiments, an apparatus includes end effector(s) that are configured to be partially submerged in a photopolymer (e.g., a resin photopolymer). Such can prevent printed part quality issues caused by printing at an open surface (e.g., an exposed surface) of the fluid photopolymer. Due to the viscosity and surface tension present in many photopolymers, issues such as delamination and warping can occur when printing at the open surface of the photopolymer. Significant time and/or hardware can be required to avoid these problems. It is therefore desirable and advantageous to print below the open surface of the photopolymer from a part quality, cost, and time of production point of view. While this presents many technical challenges, systems, apparatus, and methods described herein can overcome such challenges, e.g., due to the nature of the photopolymer and the curing process.

3D manufacturing or additive manufacturing devices and methods may use computer controlled light engines to dynamically direct light at certain portions of a photopolymer. A vessel containing a photopolymer can form a part of the 3D manufacturing device. Objects manufactured using a 3D manufacturing device are typically cured within a vessel against an optically clear window to avoid the aforementioned issues with printing at an open surface of the photopolymer. Once cured, a force exists that can hold the cured layer against the window. This force can be, for example, primarily comprised of a vacuum force (an area of relatively low pressure) created by the photopolymer shrinking and van der Waals forces to a lesser extent. This force is overcome in order to raise the print bed into position for curing the next layer of photopolymer. The mechanism and/or method used to overcome this force can be referred to as a release mechanism herein. The objective of the release mechanism is to be gentle and fast so as to not damage the cured layer but optimise the print speed. Systems, apparatus, and methods disclosed herein afford continuous lateral motion of a submerged or partially submerged optically clear window to cure against and thus have a continuous release mechanism, while also preventing the problems associated with printing at an open surface of a photopolymer.

The additive manufacturing and printing processes described herein provide several advantages over other 3D printing methods, including, for example, higher manufacturing speeds and lower cost, because such systems and methods do not require a release mechanism and/or do not require the printing process to stop to perform a release mechanism. An advantage of such a system is that the scale of the X&Y surface area cured is not limited. The carrier may move laterally, any distance, in the x or y direction without damaging the print during release. This differs from release methods common in the art that must release the entire cured layer at once. With lateral release, the release force remains constant regardless of the layers surface area.

A device according to the present disclosure can include a 3D printer and a vessel that contains a volume of a photopolymer. In addition to these components, the device can also include one or more of: a build plate that can be held parallel to an opening of the vessel (e.g., a print bed or surface upon which an object can be printed), a build arm attached to the build plate (e.g., a print bed) which attaches to the printer once installed, and/or an end effector(s). Examples of end effector(s) are described in greater detail herein.

In some embodiments, a process, referred to herein as Continuous Release Curing (CRC) or Continuous Separation Curing (CSC), uses continuous lateral motion of a low friction surface to achieve continuous non-destructive release, post curing. The devices, described in relation to CRC, set forth herein have applications in, for example, the industrial production of parts or objects as well as rapid prototyping, e.g., in automotive manufacturing, product design or consumer applications, where speed, cost and scale are important. The disclosed devices also have applicability in Science, Technology, Engineering, the Arts and Mathematics (STEAM) applications and other educational applications, including educational programs.

Processes and devices described herein relate to additive manufacturing, also referred to as 3D printing. Such processes and devices can involve a release mechanism of the additive process of forming objects by curing a photopolymer one layer after another. In an embodiment, a process and apparatus for additive manufacturing uses a process and apparatus for lateral, low friction continuous release of cured photopolymer. In some embodiments, processes and devices described herein comprise the use of a build plate and light source contained within an end effector.

Embodiments of the present disclosure relates to systems, apparatus, and methods for additive manufacturing or printing of three dimensional (3D) objects, and more specifically, to additive manufacturing or 3D printing (3DP) using end effector(s) that cure a photopolymer, where the end effector(s) are partially submerged in photopolymer within a vessel within the 3D printer device. Such systems, apparatus, and methods can cure the photopolymer in a continuous curing fashion. For example, such systems, apparatus, and methods can include a device that can cause photo initiators in a photopolymers composition to become photoinitiated (e.g., undergo a photoreaction), and thus hardening the polymer in a controlled way, continuously, e.g., without stopping to perform a release mechanism step or turning off a light source for the affordance of a release mechanism. The end effector(s) design is such that it may be mounted inside of the 3D printer and its movement is performed in a controlled and/or automated fashion along and/or about a plurality of axes of motion. The end effector(s) can be designed to be partially submerged in a photopolymer. According to embodiments disclosed herein, an end effector can be capable of curing photopolymer continuously throughout a printing process by controlling the specific point in the photopolymer that is exposed to electromagnetic radiation, e.g., by means of continuous lateral vacuum release, without having to stop the curing process to perform "separation" (e.g., release or separation of a printed layer from a print bed).

The descriptions herein refer to additive manufacturing processes and apparatus as well as to device(s) that utilize said processes and apparatus. Processes described herein can enable commercialization of fast and large scale additive manufacturing equipment. These processes can be different from currently available processes that use a non-continuous method of releasing a photopolymer, which usually occurs after curing any given layer of photopolymer. In embodiments described herein, a process referred to herein as CRC uses continuous lateral motion of a low friction surface to achieve continuous non-destructive release of a photopolymer, post curing of the photopolymer while the layer is being printed. Unlike existing systems, this process does not require the curing process to stop to enable release of cured photopolymer. Rather, the cured photopolymer is continually released as it is cured by the lateral motion of the carrier.

Certain methods or processes for additive manufacturing of photopolymer materials may use a separation method (e.g., release mechanism) that requires stopping the curing process during the printing process. Processes and devices described herein do not require the build plate to stop or reverse direction, which can have significant time savings throughout the printing process. For example, such processes and devices do not require the build plate to lift, stop, and then drop on each layer of photopolymer. Additionally, these processes do not require a light source to be disabled for a period of time to allow the release mechanism to complete, again having considerable time savings throughout the duration of the printing process. Furthermore, as the photopolymer shrinks during curing, releasing a full layer at once means the force generated by the low pressure area generated must be overcome at once. This means, in a traditional cure and lift release process, there is a surface area dependency on the low pressure forces generated. This dependency limits the practical scale, in the X and Y axes, of the 3d printer as the release force will become destructive to the photopolymer or the device itself at a certain scale. The process described herein overcomes this issue by making the released surface area a constant.

Continuous Separation Curing (CSC)

Figure 2A:
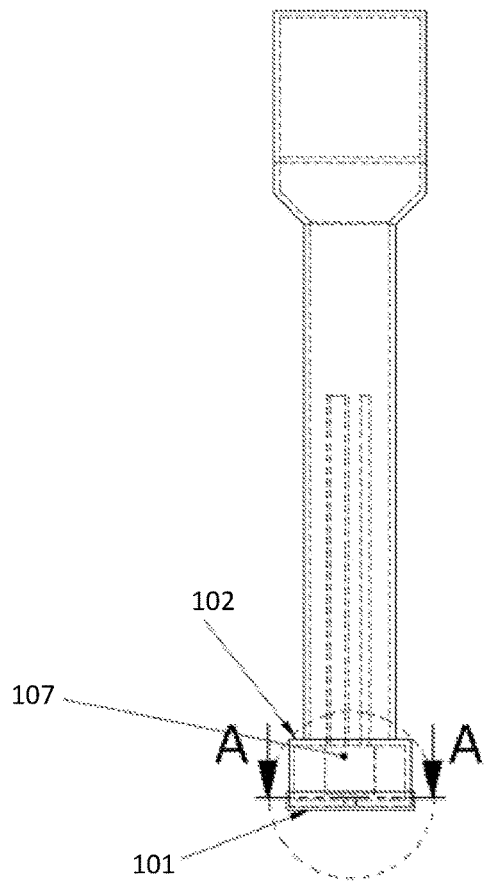
Figure 2B:
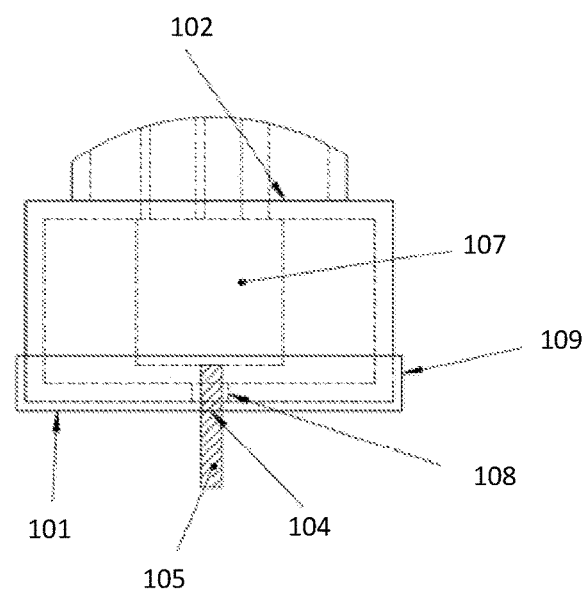
Figure 2C:
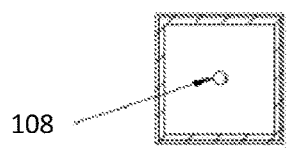
Figure 3:
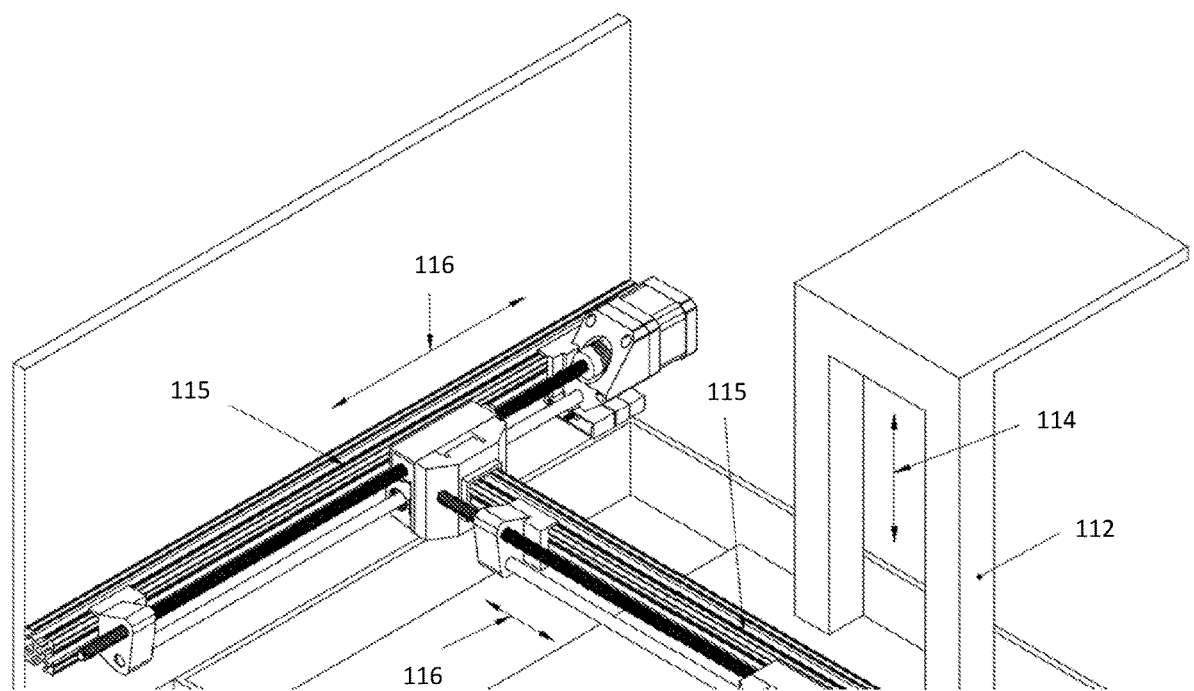

Referring now to FIGS. 1-3, an embodiment is shown of a 3D printing device 100. The 3D printing device 100 can include an end effector 102 that operates according to a continuous lateral release operating principal, e.g., where the release mechanism is achieved by continuous lateral motion of the end effector. FIGS. 1 and 2 depict a contact area 101, where the end effector 102 is partially submerged in a photopolymer 103, e.g., to prevent issues related to printing at an open surface of the photopolymer. FIG. 2 depicts the cure area 104 where the photopolymer is being cured while being exposed from the top side from within the end effector 102. The light path is denoted by box 105. As depicted in FIG. 3, the end effector 102 can move in directions (x) and (y), identified using arrows 116 in FIG. 3 along axis or rails 115, and the build plate 110 can move in direction (z), identified using arrow 114 in FIG. 3, but it can be understood that this an example of a mechanical configuration. Optionally, adjustment in the z direction can also be possible, as noted by fixture 106. The end effector 102 contains a light source 107, an aperture 108 to emit light, as illustrated in FIG. 2. This aperture 108 may be adjustable in diameter, e.g., in an automated fashion, via internal effector mechanics or via a Liquid Crystal Display (LCD) placed over an orifice (e.g., a largest orifice) and smaller diameters simulated via masking the light transmitted through the LCD by controlling the image displayed on the LCD. Alternatively, the light source may be a LASER with fixed orifice. Any light source with a suitable wavelength and intensity may be used. The light source 107 may be turned on and off via electronic control. The tip of the end effector 102 is covered by a low fiction material 109 that is flat at the lowest point. This low friction material or coating is optically clear and transmissive to light within the ultra-violet spectrum of electromagnetic radiation. Examples of suitable coatings are Polydimethylsiloxane, Polytetrafluoroethylene and derivatives of ethylene propylene but it can be appreciated by anyone skilled in the art that any such suitable coating can be utilised.

FIG. 1 schematically depicts an example manufacturing device implemented as a 3D printing device or 3D printer, according to embodiments described herein. Making reference to FIG. 1, the CSC process (also referred to herein as CRC) uses an end effector 102 capable of continuous release of cured photopolymer, e.g., release of photopolymer without requiring delay and/or stopping of the curing process (e.g., without requiring a light used for curing to be turned off). The photopolymer is contained within a vessel 120 illustrated in FIG. 1. The end effector 102 is configured such that it is partially submerged in the photopolymer 103 at the vessel's 120 opening 121 in the case of a top down orientation, or fully submerged in the case of a bottom up orientation. Contained within the end effector 102 is a light source 107 (FIG. 2) capable of emitting electromagnetic radiation within the ultra violet spectrum. The orientation of the light source 107 is such that the emitted light 105 is directed towards the photopolymer 103 and print bed 110. One side of the end effector 102 is coated with a non-stick coating 101, such as, for example, Polydimethylsiloxane, Polytetrafluoroethylene or Fluorinated Ethylene Propylene. When installed, the end effector 102 is orientated such that the side coated with a non-stick material is the side facing the print bed, i.e., the side in contact with (e.g., submerged within) the photopolymer 103. In the case of a magnetic linkage as described in FIG. 8, both sides of the carrier may consist of a non-stick material, and in some embodiments, the light source is facing the print bed.

In an embodiment, a printed object is built up by moving an end effector (e.g., end effector 102) throughout the photopolymer laterally in a controlled fashion (e.g., according to a predefined sequence of motions) as opposed to directing laser light or projected images from a digital light projection system. The light source 107 is contained within the end effector 102 and/or the light from the light source 107 is directed through the end effector 102. The end effector 107 is moved within the photopolymer 103 in a controlled fashion to cure the photopolymer 103 in the desired areas for any given layer of the print. The first layer (e.g., slice) can represent the bottom of the object as viewed from above. The second layer (e.g., slice) can be the geometry of the object one layer-height higher and so on until the last layer, representing the top of the object, is printed. The process can use a build plate 110 (e.g., print bed) which can move in the z-direction (e.g., vertically) within the vessel 120 containing photopolymer 103. As the end effector 102 moves throughout the printing process, its continuous lateral motion releases the cured photopolymer from the non-stick coating 101 of end effector 102 in a non-destructive way. An example of such a coating is Fluorinated ethylene propylene. It should be appreciated that in some embodiments, the carrier may be configured to move in the z direction, it is effectively the same as moving the print bed 110.

Figure 4:
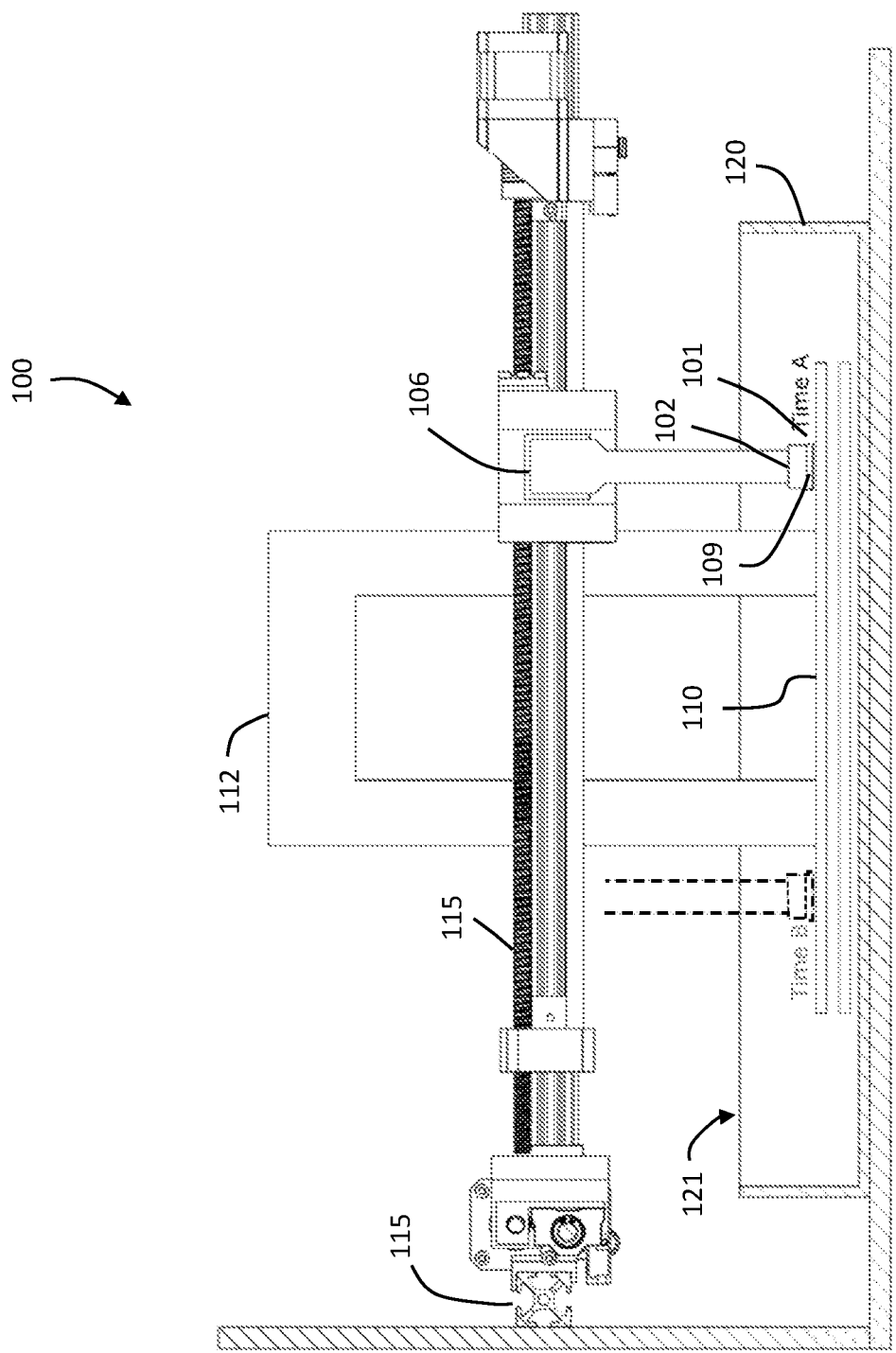
FIG. 4 depicts the 3D printing device of FIG. 1 having an end effector-2 during the printing process with time A showing an initial position, and then as the print progresses, time B showing where the components of the manufacturing device (e.g., printer) can be a period of time into the printing process in accordance with an embodiment.
Figure 5:
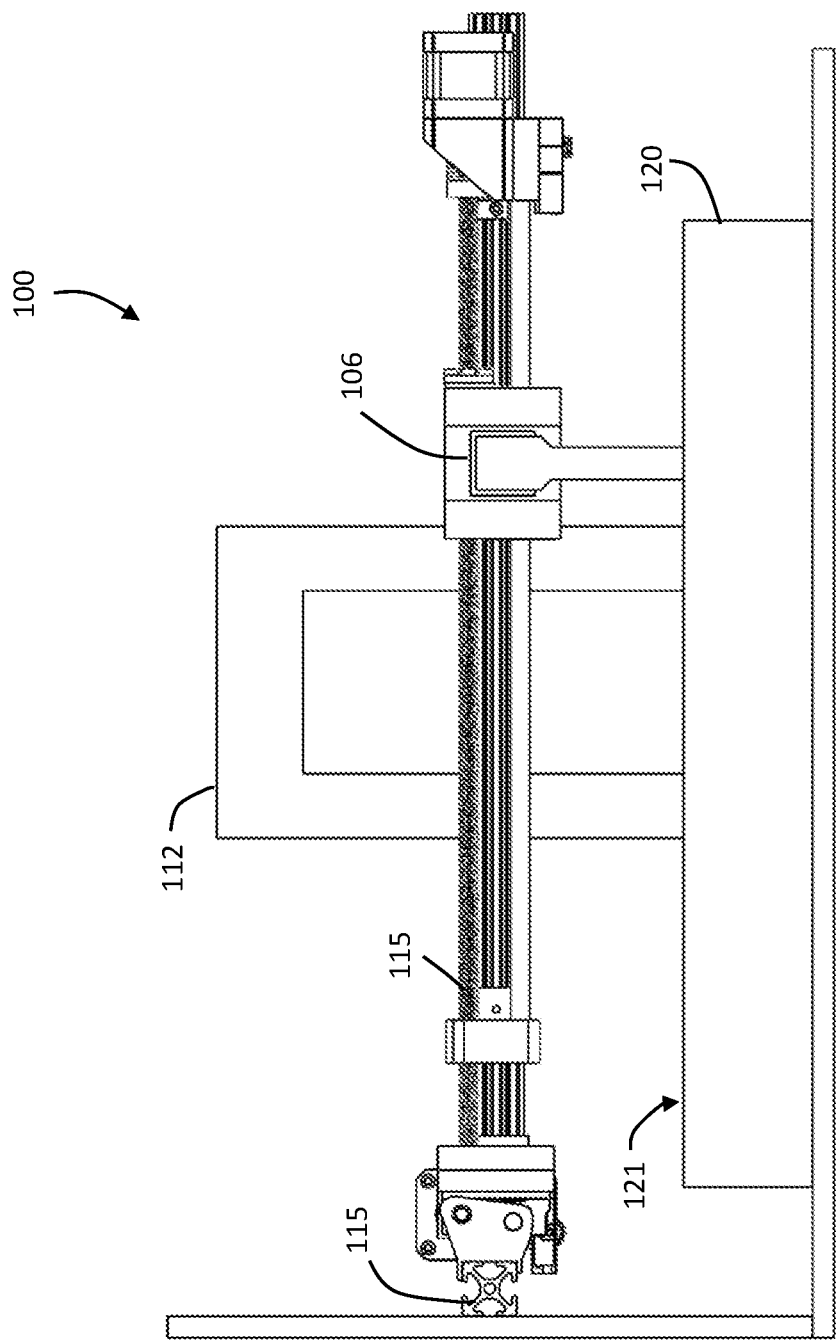
FIG. 5 depicts a front view of the 3D printing device of FIG. 1 with end effector-2 installed in accordance with an embodiment.
Figure 6:
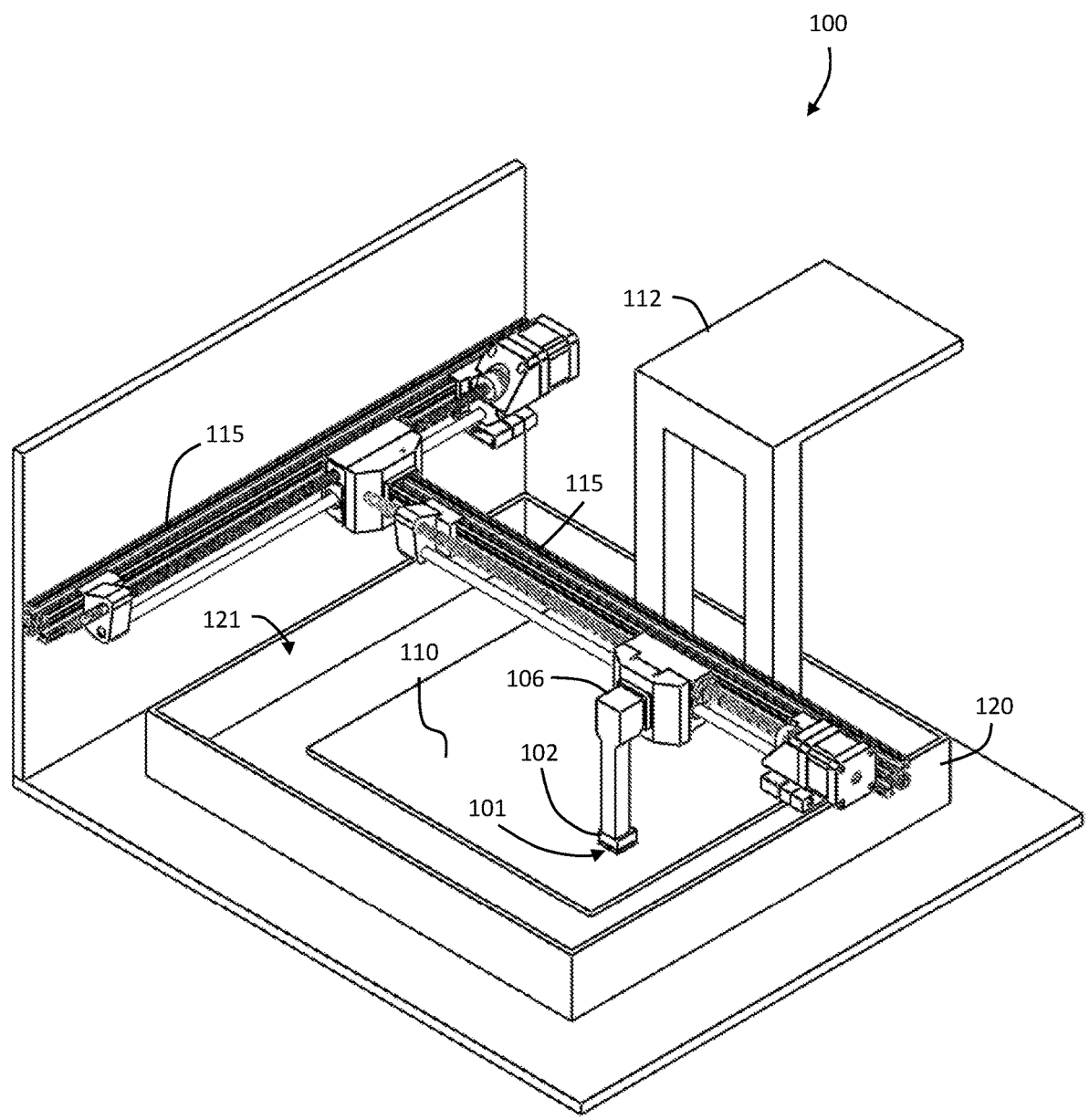
FIG. 6 depicts a perspective view of the 3D printing device of FIG. 1 with end effector-2 installed in accordance with an embodiment.

To manufacture any given object (e.g., a 3D model) with a top down orientation, a print bed 110 is raised to the top portion of the vessel 120 such that it is 1-layer height below the lowest point of the end effector 102, which is an adjustable distance below the top surface of the photopolymer 103. Such distance adjustments can be accomplished before starting the printing process. Contained within and/or operatively coupled to the 3D printing device 100 can be a processor that can control the movement of the end effector 102, laterally in a plurality of axes, and movement of the print bed 110, vertically, e.g., in an automated fashion. The print bed 110 can be attached to a build arm 112, which in turn can be attached to other portions of the 3D printing device 100. When in its initial starting position "A" as illustrated in FIG. 4, Time A, the printing process can begin. The light source 102 is then turned on, such that its light passes through the UV transmissive, optically clear non-stick coating 101 (non stick refers to smooth materials characterised by a low coefficient of friction when in contact with a 3D print) and subsequently cures the photopolymer 103. This cures a circular portion 108 (FIG. 2C) of photopolymer 103 of determinable cross section, thickness and/or volume to the print bed 110. For descriptive purposes, this small volume can be considered as curing a single point in space (e.g., a portion of a layer) as opposed to curing the entire 'layer' or 'slice' at once, as is the case with digital light projection systems. During the curing process, light may or may not pass through additional layers of materials or components such as, for example, a liquid crystal display. When compared to a LASER galvanometer configuration, which is common in the art, the lateral motion of the carrier provides a more consistent dot size as the light source 102 is directly above the point of curing. In a LASER galvanometer configuration, the shape of the beam will be round when directly in front of the final mirror but as the LASER is pointed further from dead center, perhaps to the edge of a photopolymer tank 120, the beams image becomes oblong and not circular. Furthermore, in some embodiments, the LASER source may be further from the photopolymer 103 in a galvanometer configuration (not shown) which results in a higher power requirement for the component. In a CSC configuration, the light source 102, which may or may not be a LASER, is a constant distance from the polymer 103. This provides advantages in reducing control complexity and thus machine cost.

End effector 102 can be moved laterally in a pre-determined path, e.g., via motorised linear motion axes 115. Based on the pattern formed by the light, which provides the cured photopolymer, a layer of the object can be cured (e.g., printed). The end effector 102 then may or may not be moved to a pre-determined 'park' position, e.g., where the end effector 102 is no longer located directly above the cured layer of photopolymer. The print bed 110 with the cured layer of photopolymer is then lowered, e.g., it is moved in a direction that increases the distance between the print bed 110 and the end effector 102 as illustrated in FIG. 4 (see Time B, FIG. 4). The distance the bed 110 moves is pre-determined and automated in fashion. The process then repeats with the bed 110 moving one-layer height further away on successive layers until the object is built-up/fabricated.

The lateral motion of the end effector 102 allows the separation and/or release of the cured photopolymer, e.g., by overcoming a post-curing force generated by an area of low pressure that exists between the cured photopolymer and the non-stick coating 101 of the end effector 102. By moving laterally, e.g., (x) and (y) motion, rather than directly applying a tangential force, e.g., in the (z) direction, the force experienced by the cured photopolymer (e.g., force overcome to separate the cured photopolymer from the end effector) can be reduced. This phenomenon can be experienced, e.g., when sliding a "suction cup" off of a smooth surface in a lateral direction rather than pulling on the "suction cup" in a vertical direction (e.g., away from the surface). The configuration of the end-effector 102 and mechanical layout of the 3D printing device 100, and associated methods, enables the device 100 to continually separate during the printing process while curing, unlike other methods of 3D printing. This provides advantages in significantly reducing the printing time duration of large parts and allows for large layers to be cured that would otherwise damage the print during perpendicular release Taking the simple example of a 1 mm diameter circle cured to a height of 0.1 mm. Assuming the diameter remains constant, the force required for perpendicular release can be derived from the definition of pressure where force is equal to area times pressure. Therefore;

$$F_{perpendicular} = (pi)(0.01 \text{ m})^2(P) \quad (1)$$

where P is pressure in Pascals. In this case, as the print is submerged in a liquid with a density far greater than air, we can assume the pressure is always greater than 101,325 Pa or atmospheric pressure. In this case $$F_{perpendicular} = (pi)(0.01 \text{ m})^2(101,325) = 31.83 \text{Newtons} \quad (2)$$

Alternatively, in the case of lateral release the end-effector 102 must overcome the limiting friction caused by the cured edges being in contact with it for the most part. Therefore:

$$F_{lateral} = \mu R \quad (3)$$

where μ is the coefficient of friction and R is the normal reaction force. This force acts in a direction opposed to motion taking place and is parallel to the surfaces in contact. In this instance, R, the normal force, is equal to that of $F_{perpendicular}$ and as the coefficient of friction between the low friction window' material and perfectly parallel cured resin will always be below contact area 101 by design we can say that $F_{lateral}$ is always lower than $F_{perpendicular}$. In practical application, this makes a large difference as μ is likely in a range of values below 0.5 depending on the end effectors speed and temperature as well as some other material characteristics. Choosing a conservative value of 0.5 would mean F lateral is half that of $F_{perpendicular}$.

Taking this into account, along with the consideration that the surface area cured at any one moment is small and constant (unlike other common methods) highlights how this release process can produce far less force on a print compared to other methods and how it is scalable in the X and Y axes, where otherwise a large $F_{perpendicular}$ value would become self-destructive.

An additional embodiment is described herein, with reference to FIG. 13, for mitigation of the low-pressure region formed due to curing. Continuous low-pressure mitigation, with lateral motion, may also be achieved by the controlled application of a gas such as air in the region directly between the end effector and the resin. In this way, the gas takes the place of the low friction material which was previously described as residing on the face of the end-effector. In this embodiment, the gas fills the volume where low pressure would have otherwise occurred. This gases pressure and flow rate are monitored and controlled in an automated fashion such that the distance from the photopolymer to the end effector remains constant. It should be noted that this differs from the aforementioned in that lateral motion is not equalising the low pressure region with photopolymer ingress, rather it is the inflow of gas maintaining a constant pressure. In both instances, controlled fluid ingress occurs in the low-pressure region and lateral motion occurs following said curing. Furthermore, in this configuration, utilizing a gas, a top down set-up is desired for the 3D printing device.

Figure 13A:
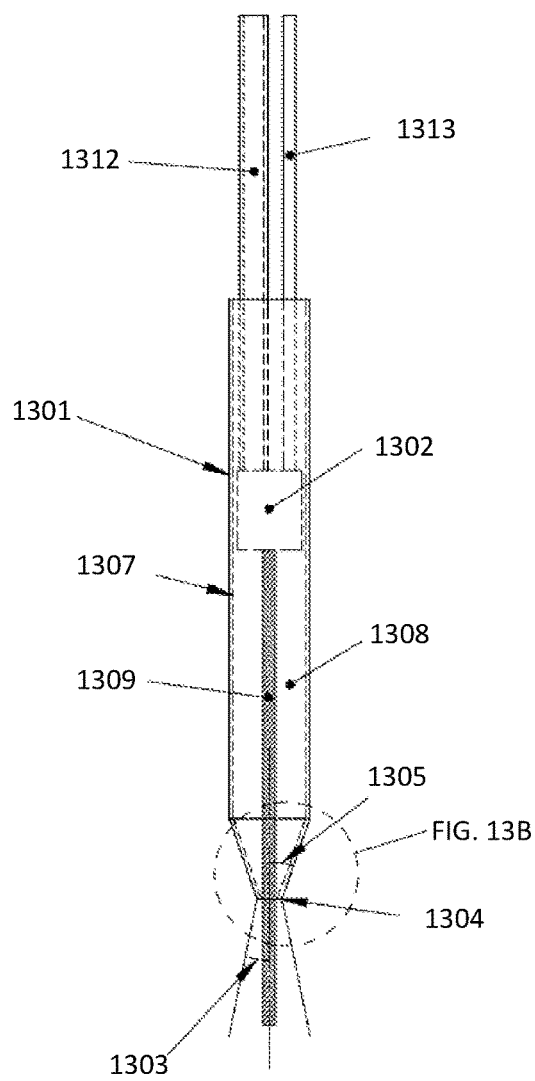
FIG. 13 depicts an end effector utilising a gaseous barrier in place of a low friction material in accordance with an embodiment.
Figure 13C:
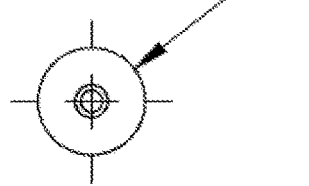
Figure 13B:
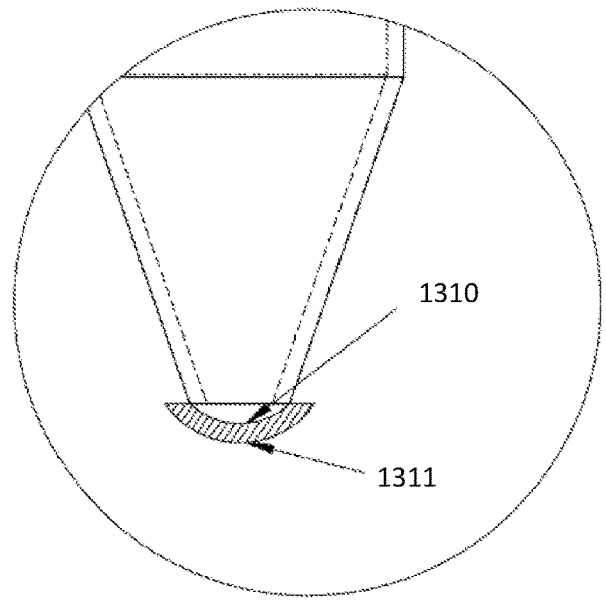
Figure 14:
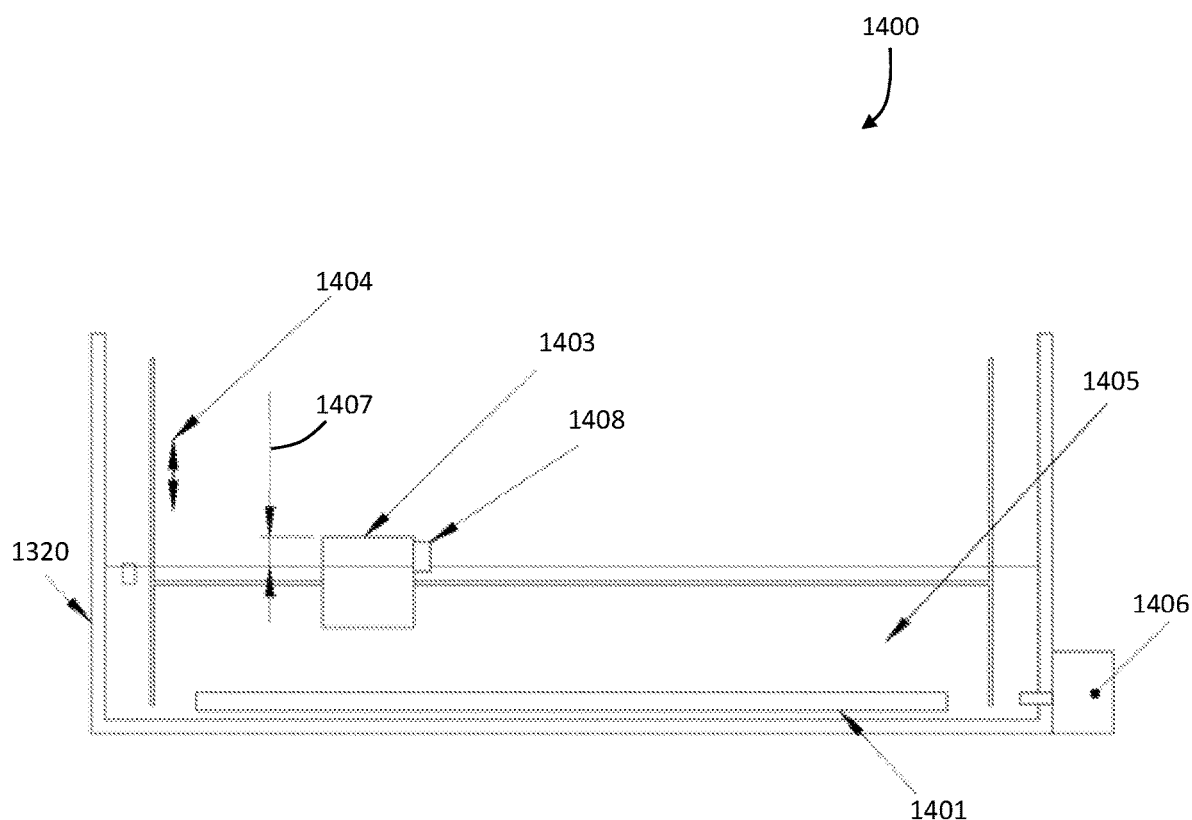
FIG. 14 is a schematic illustration of a 3D printing device utilizing lateral release where the bed need not move during the printing process in accordance with an embodiment.

FIG. 14 provides a detailed view of an end effector 1301 for a 3D printing device in accordance with another embodiment. As depicted in FIG. 13A, end effector 1301 can contain a light source 1302. The light source 1302 may be turned on and off via electronic control (e.g., a processor electrically coupled to the light source 1302). As shown in FIG. 13, it is desirable to have a reduced or minimum angle of dispersion of light (as represented by box 1303) in order to increase the amount of light exiting the tip 1304 of the end effector 1301 and curing the photopolymer (e.g., resin). The tapered profile or shape 1305 of the tip 1304 of the end effector 1301 has an angle of inclination operable to reduce the contact area between the tip 1304 and cured photopolymer (e.g., resin) directly beneath the tip 1304 and to reduce the amount of drag on the end effector 1301 during operation (e.g., as the end effector 1301 moves through the photopolymer). In addition, the end effector 1301 has a cross-sectional profile or shape 1306 along its length that is cylindrical to reduce the forces applied to the end effector 1301 by the photopolymer during operation. The inside wall of the end effector 1301 is lined with a reflective coating 1307 in order to increase light output from the tip 1304. Before printing, a gas such as air is allowed to fill the hollow void or space 1308 in the end effector 1. During printing, this gas can prevent or reduce the risk of photopolymer entering the end effector 1301 and impeding a light path 1309 of light emitted by the light source 1302, e.g., due to the pressure of the gas inside the end effector 1301. The gas can provide or act as an interface between the light source 1302 and the photopolymer. This is similar to the low friction coating described earlier. The gas can be air containing oxygen, which can impede the curing of a photopolymer due to its chemical composition and way of crosslinking. As shown in greater detail in the FIG. 2B, the gas 1310 at the tip of the end effector 1301 forms a buffer zone 1311 where any photopolymer (e.g., resin) in contact with the gas 1310 does not cure. This can result in a thin layer of uncured photopolymer (e.g., resin) between the gas or air buffer and the cured resin, for any given cured layer of photopolymer. The volume and/or pressure of gas may be altered and monitored during the printing process via a gas delivery line 1312, which has a regulated gas flow. The regulated gas flow of the gas delivery line 1312 can enable the volume and/or pressure of the gas in the void 1308 and/or at the tip 1304 of the end effector 1301 to be adjusted. This can be used, for example, to adjust the operating conditions based on a type of photopolymer being used, e.g., different gas pressures may be desirable for different photopolymers based on the various characteristics of the photopolymer such as, for example, viscosity and surface tension. A routing path 1313 for electrical cables and/or other connectors for the internal electronics housed within the end effector 1301. This end effector configuration depicted in FIG. 13, utilizing an gas in place of a low friction material, is referred to as a gas barrier herein. It should be noted that the air pressure provides advantages in ensuring smoothness of the cured photopolymer, like that of the low friction material 101 on the end effector 102 described with reference to FIG. 1, overcoming issues associated with printing at the open surface as well as reducing or minimising release forces post curing.

Continuous Release Curing (CRC) Additive Manufacturing Device

Devices described herein, such as example devices set forth in FIG. 1, can include components required for a printing process, including, for example, an additive manufacturing device main body (e.g., a 3D printer 100) comprising a continuous release curing end effector/print head (e.g., end effector 102) described herein alongside a number of subcomponents.

3D Printer

As shown in FIG. 1, the printer 100 can include an build arm 112 attached to a linear guide axis 115 and motion components, build plate 110 (which can move vertically, e.g., along a z-axis, during the printing process) attached to a build arm 112, an end effector 102 comprising a non-stick coating on a flat surface 101 and a light source 107 capable of emitting the desired wavelength of electromagnetic radiation for photopolymer curing (e.g., crosslinking) in the desired areas of the build area dynamically. The light source 107 can be turned on and off via electronic control elements (e.g., a processor) during the printing process. The printer 100 also comprises of a vessel 120 capable of containing a photopolymer.

The printer 100 is capable of moving the end effector 102 along a plurality of axes 115 (e.g., linear axes such as an x-axis or y-axis). The printer 100 may also contain subcomponents that may or may not be necessary for the operation of the end effector 102, such as, for example, a fluid pumping apparatus or LCD control electronics.

In an embodiment, the movement speed of the end effector(s) is controllable, e.g., via a processor, and can be optimised to allow for increased speed of exposure of the photopolymer 103.

The end effector 102 is configured such that it can be manufactured in a number of ways and/or a combination of methods can be employed. For example, an end effector 102 and/or its sub-components can be injection moulded, e.g., sub-components such as the non-stick coating 101 can be poured in liquid form and allowed to set hard. The vessel 120 and/or other components of the manufacturing device may be made of any suitable material which can withstand exposure and contact to the photopolymer or any combination of suitable materials, such as, for example, Polypropylene, acrylic, silicone and glass.

Referring now to FIG. 8, a magnetic linkage 803 is shown that provides another example of a mechanical implementation of CRC. The end effector's 801 motion is controlled in a similar fashion to other embodiments described herein except the end effector 801 is magnetically held in place rather than being held using mechanical fastening. This allows the end effector 801 to be located within the photopolymer vessel or container 820 while the motion components 802 are located below the container 820 (e.g. on the opposite side of the surface 804 from the end effector 801. This can be described as a bottom up configuration. This configuration allows for less photopolymer in the vessel during printing. The magnetic linkage 803 may be electromagnetic, and computer controlled such that the magnetic linkage 803 can be turned on and off. Additionally, the magnetic field generated may be used to rotate the end effector 801 in a controlled manner. A plurality of end effectors 801 may be utilised by providing a 'park' position for each end effector, e.g., an area clear of (e.g., away from) the printing process and/or region. As such, an end effector 801 may be 'parked' by moving it to the designated park position and magnetically de-coupling by turning off the electro-magnet. The motion components 802 then move to a position directly below another end effector 801 and magnetically couple to it. Another advantage of this configuration is that the end effector 801 is free to operate in a segregated portion of the photopolymer container 820. This is useful in large volume build areas, because it allows the user to use a smaller volume of photopolymer within the container while printing smaller objects as discussed herein with reference to FIG. 10. In this configuration the bottom of the end effector 801, that is the side in contact with the photopolymer vessel 820 may be made of a material which reduces the coefficient of friction between the two, such as but not limited to Delrin for example. Any number of magnetic components 803 may be used to ensure synchronous motion of the carrier and end effector 801. The material chosen for the bottom surface 804 of the photopolymer vessel 820 may include but is not limited to a non-ferrous and smooth material such as Delrin or Acrylic.

Figure 12:
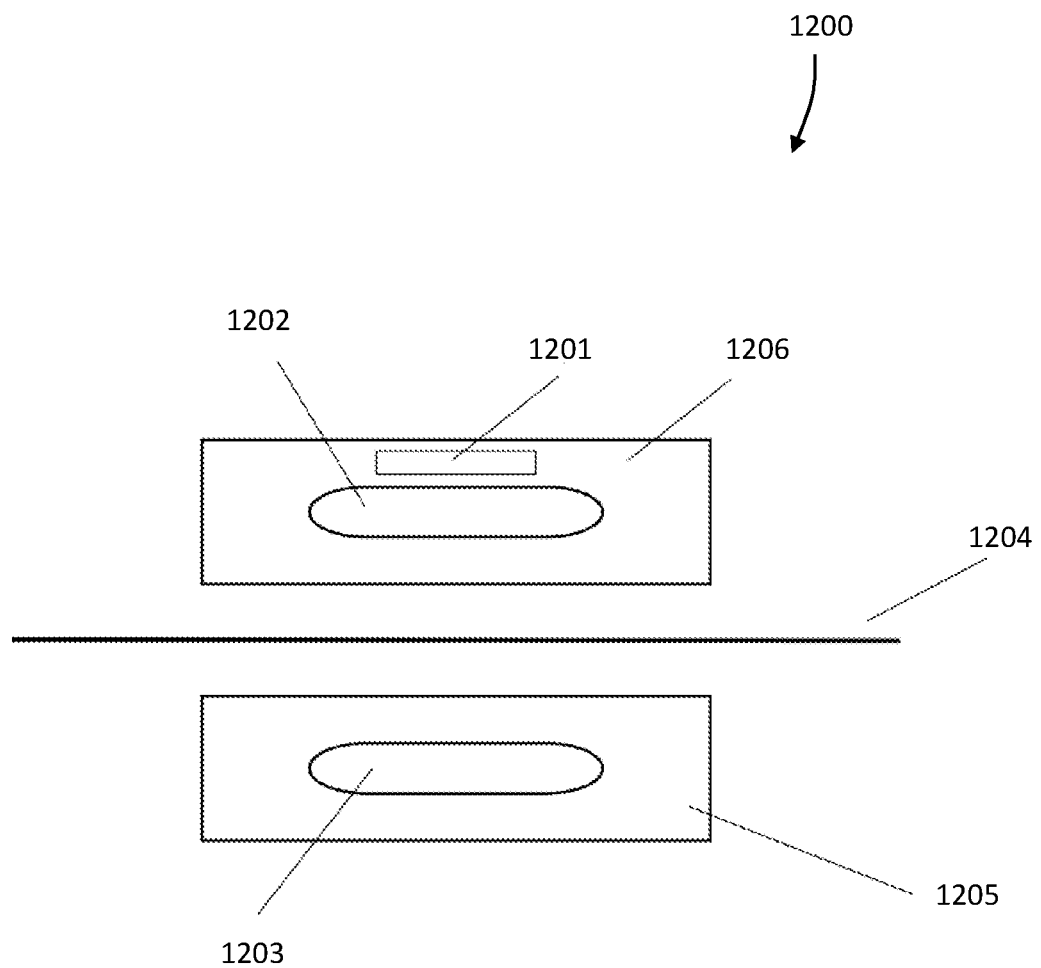
FIG. 12 depicts an end effector whose light source is contained therewithin and is powered by electromagnetic induction in accordance with an embodiment.

FIG. 12 depicts a configuration where the light source 1201 is powered by wireless means using an electromagnetic induction coil 1202 located within the magnetically coupled end effector 1206. The power electronics 1203 to drive the induction coil 1202 are located in the carrier outside of the photopolymer container 1204. As the carrier 1205 moves in a plurality of directions, the magnetic linkage moves the end effector 1206 to keep the end effector 1206 directly above the carrier 1205.

Referring now to FIG. 14, a system 1400 is shown that is configured such that the print bed 1301 need not move, which is uncommon with photopolymer printing, and provides a particular advantage in large scale machines. The print bed 1301 commonly bares the weight of the printed component/object when raised from the photopolymer vessel 1320 and the bed 1301 must maintain tight tolerances on its position when moved. Such a structure can be expensive when the print bed 1301 is large, for example a 0.5 m×1 m bed would be more cost effective being static due to the leverage forces experienced by the bed when moving. Furthermore, in practice as the build plate surface area gets bigger, the thickness of the plate must also increase to maintain planarity, making it heavier and more costly again. Overcoming this cost has practical benefits in building and deploying a device 1400. Depicted in FIG. 14 is a static print bed 1401 located at the bottom of the photopolymer vessel 1420. The end effector 1403 can move in a plurality of axes including vertically as indicated by arrow 1404. This vertical motion of the end effector 1403 replaces the vertical motion of the bed as is common in the art and described earlier in this document. This some embodiments, this is made possible due to the end effector 1403 being tolerate of being partially submerged in the photopolymer 1405. As the end effector 1403 is raised, layer by layer, a volume of photopolymer 1405 is pumped into the vessel 1420 by a peristaltic pump 1406 which maintains its surface position relative to the end effector 1403. As the end effector 1403 raises during the printing process, the photopolymer pump 1406 and associated sensory components maintain the distance 1407 within a tolerance. A sensory component 1408, such as a float switch for example, is denoted. This is an example of a sensory component 1408 used to maintain said distance 1407. It should be noted that, without the laterally releasing end effector 1403, where one would otherwise be printing at the open surface as described herein, the level of precision by the pump 1406 and sensory components 1408 to maintain a constant distance 1407 from the light source to the surface of the photopolymer 1405 would have to equal that of the layer height being printed, E.g. 0.05 mm. The practical cost of implementing such a system is far greater than the tolerances afforded by the end effector 1403 such as 1 mm.

Certain advantages associated with the continuous curing of a photopolymer during a printing process, to which the processes and apparatus described herein refer (e.g., the assembly of the present disclosures, including end effectors 102 and the CRC), include but are not limited to: the reduction of forces between the printed object and the membrane floor (e.g., lower surface of the end effector) allow for gentler separation (e.g., less force to be overcome for separation) and thus less risk of damage to the cured photopolymer or printer; the lateral motion of the end effector is continuously releasing from cured photopolymer during the printing process, making the release force a constant and allowing for non-destructive printing of any X and Y surface area; the end effector may be magnetically linked to the linear motion components and be decoupled in an automated fashion; the magnetically linked end effector may be wirelessly powered via electromagnetic induction (the power components residing outside the container and the receiving coil residing in the end effector); the continuous separation of end effector 102, via continuous lateral motion, does not impede or stop the curing/printing process (e.g. the light source does not have to turn off in order to complete the separation of cured photopolymer); the end effector can be configured to afford a static print bed during the printing process; and, the device can have light source(s), e.g., contained within the end effector(s), be mounted such that the light emitted from the light source(s) strikes the photopolymer.

CRC Printer Device(s) Use and Operation

In operation, a user can plug in (e.g., connect a power source to) a manufacturing device (e.g., the 3D printer 100 shown in FIGS. 1-6, and/or any other embodiments described herein). The user then loads a 3D object file (e.g., of a particular print) onto the device, e.g., using software installed on a processor of the device.

The user can select various settings relative to the particular print geometry and photopolymer in use. The user can start the print via an interaction of software and hardware (e.g., via a user interface, such as visual and/or audio user interface), which can be, for example, described in an operating manual. Once the print has begun, the printer dynamically moves the end effector(s) as needed in a pre-determined path. Once a "layer" of the path (e.g., a layer of the print) has been completed, the print bed is moved downwards (e.g., away from the end effector(s)) at a rate defined previously. The end effector is then moved in a pre-defined path required to complete "layer" 2, where such pre-defined path can differ from that of "layer" 1, e.g., as specified by the 3D object file. While the end effector is following the path of each layer, the light source is enabled and disabled electronically in the desired positions in order to cure the photopolymer is the desired areas. Repeating this process in successive layers builds up the desired object/print.

Figure 7:
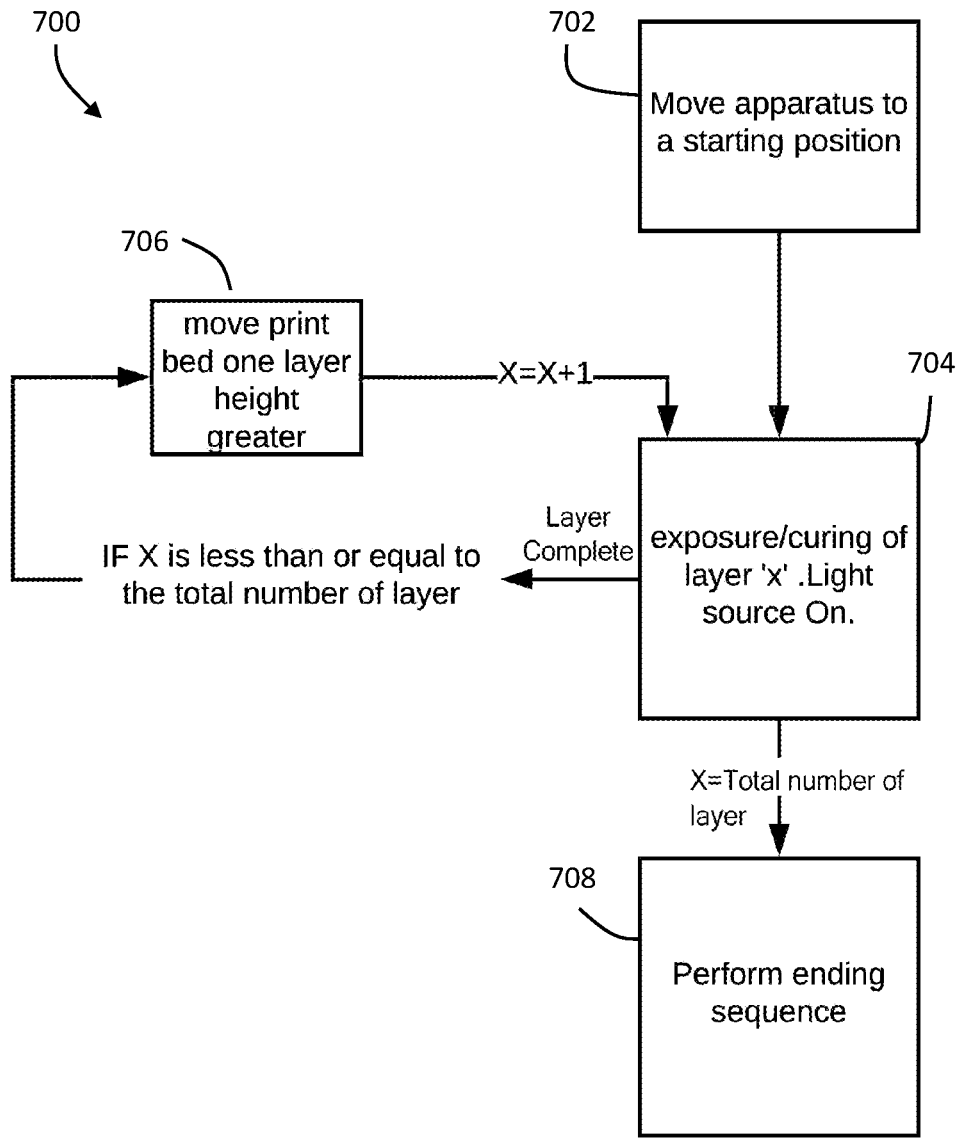
FIG. 7 depicts a flowchart of an example operational flow of a manufacturing device, according to embodiments disclosed herein.

Referring now to FIG. 7 an embodiment is shown of a method 700 of operating a manufacturing device, such as device 100 for example, according to embodiments described herein. The method 700 starts in block 702 where the device is moved to a starting position. This may include moving the end effector and/or the print-bed/build-plate for example. The method 700 then proceeds to block 704 where the light source is activated to cure the photopolymer. In block 704, the end effector may be moved relative to the print-bed/build-plate to form the layer in a predetermined manner. When the current layer is not the last layer (e.g. layer "X" is less than the total number of layers), the method 700 loops to block 706 where the print-bed/build-plate or the end effector is moved a distance equal to one layer height or greater.

Figure 8A:
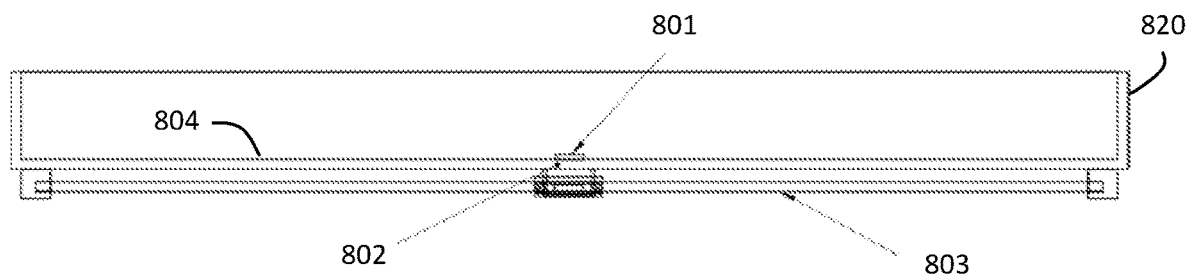
FIGS. 8A, 8B, and 8C depict a mechanical configuration integrating magnetic linkage between motion components and an end effector in accordance with an embodiment.
Figure 8B:
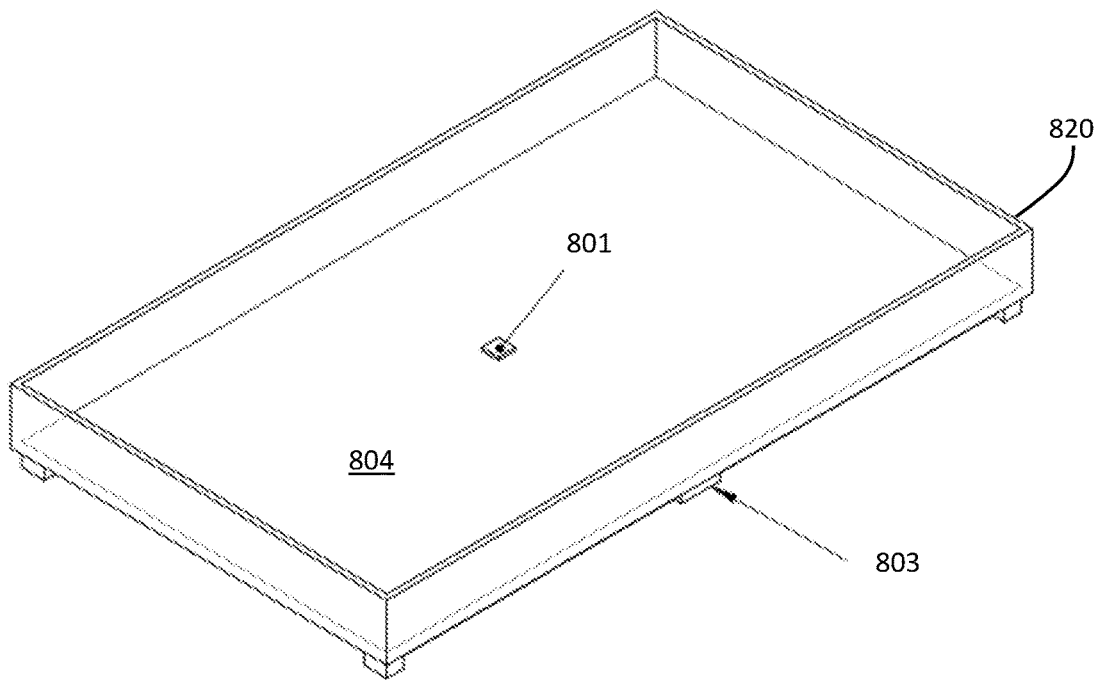
Figure 8C:
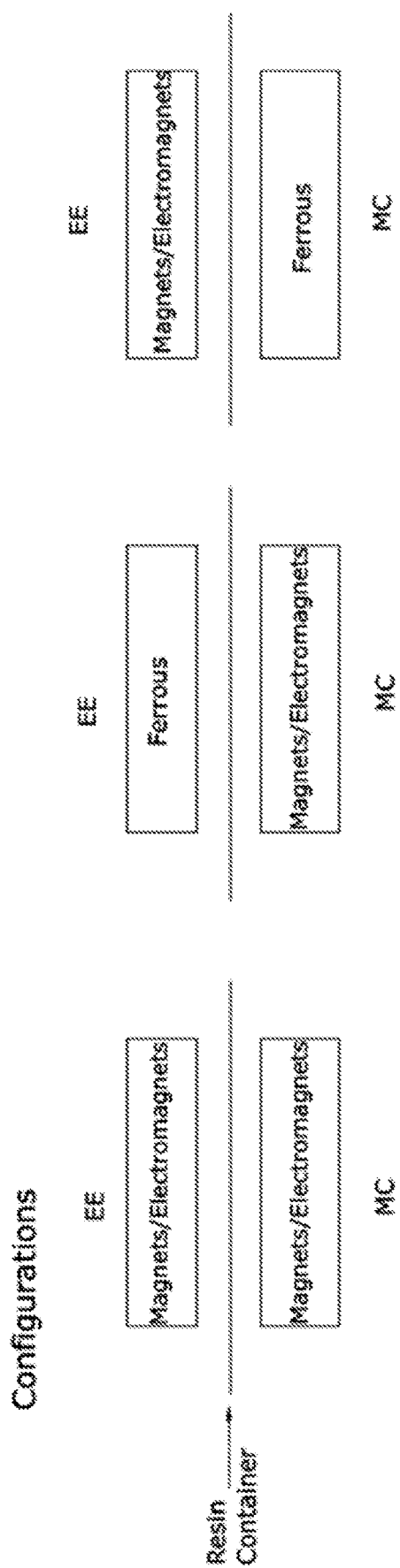

FIGS. 8A-8C depicts an example mechanical configuration integrating magnetic linkage 803 between the motion components 802 and the end effector 801. In some embodiments, the linkage 803 can be permanently magnetic and/or electro-magnetic. Such features can provide advantages including locating/placement of the motion components outside the photopolymer container, as illustrated. Additionally, such features can allow the motion components to 'park' and 'drive' a multitude of end effectors. Furthermore, such features provide for segmenting the volume within the photopolymer container to allow printing in a smaller cross-section of the container.

Figure 9A:
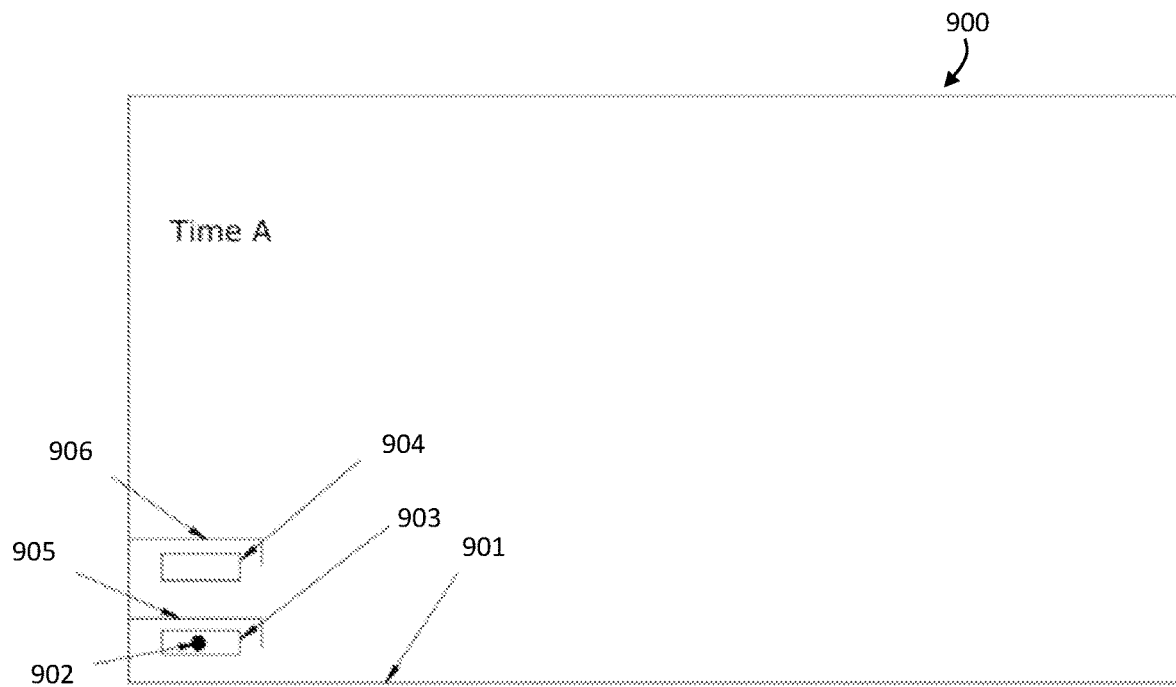
FIGS. 9A, 9B and 9C are schematic illustrations depicting configurations at different times, according to some embodiments.
Figure 9B:
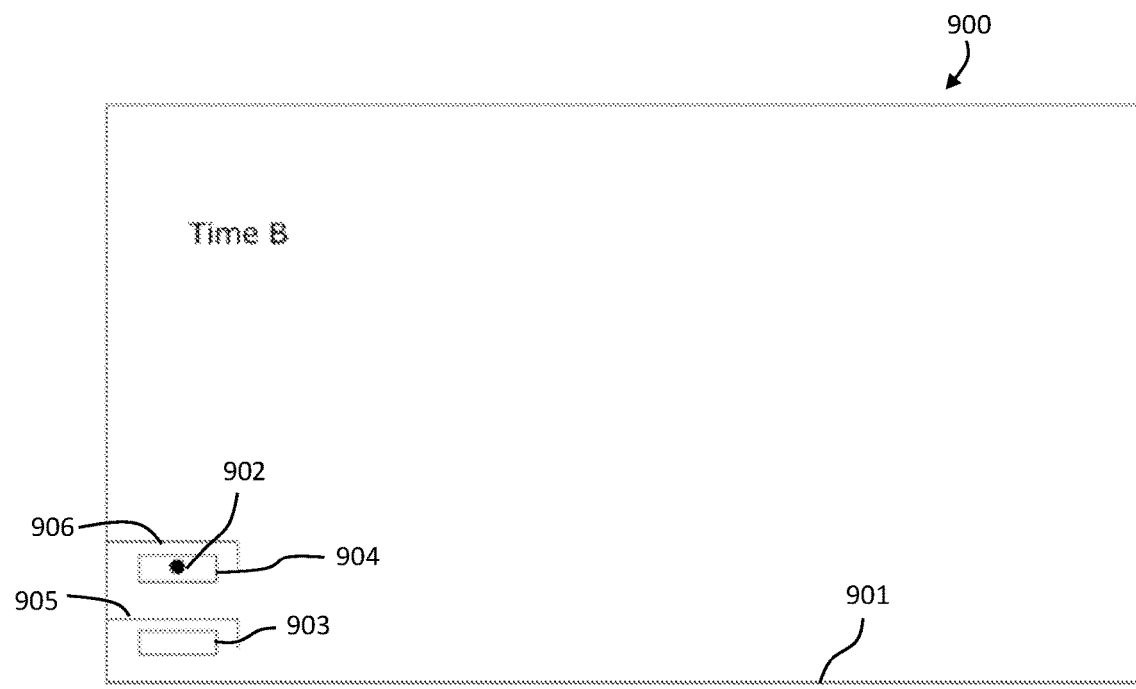
Figure 9C:
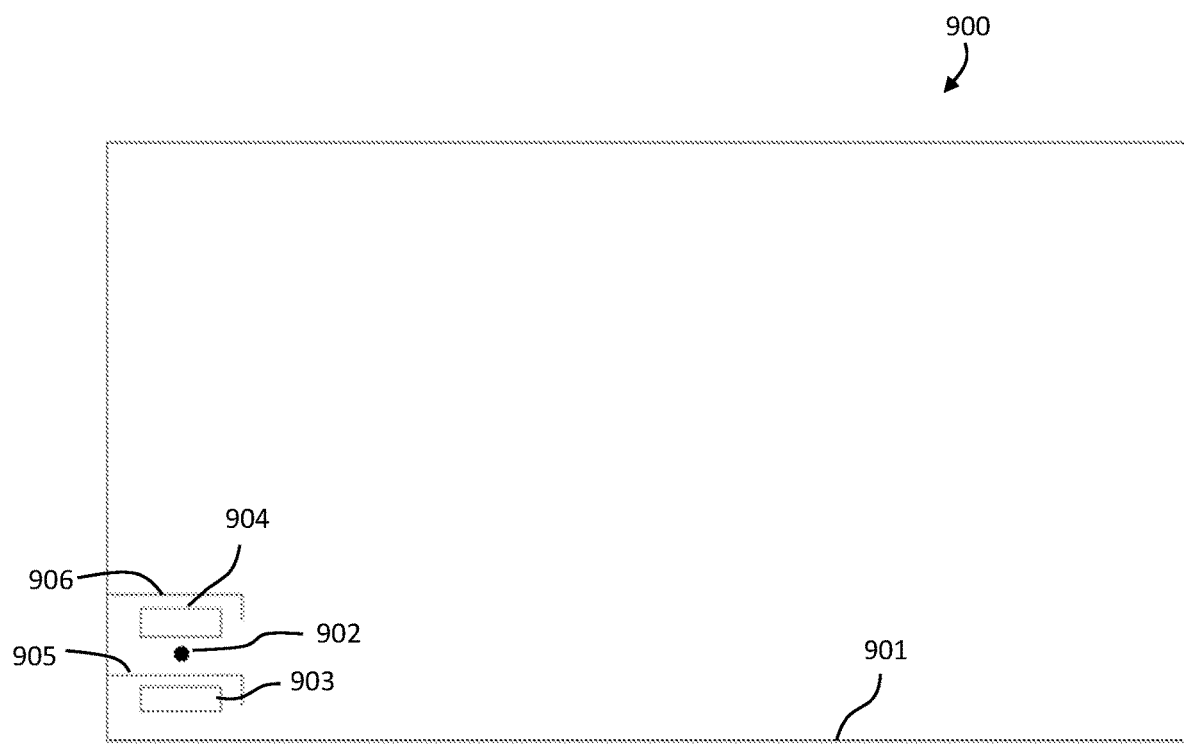

FIGS. 9A and 9B depicts the top-down view of a system 900 having motion components 902 and a plurality of end effectors 903, 904 at two times within a photopolymer container 901. At time A (FIG. 9A), the motion components 902 have moved end effector 903 to its park position 905, having completed its 3D printing task. The motion components 902 can then be magnetically de-coupled. At time B (FIG. 9B), the motion components have moved to a position directly beneath a second end effector 904 and second end effector 904 is magnetically coupled to them. The second end effector 904 can then be moved along the motion components axes to complete its 3D printing task. When the 3D printing task is completed, the second end effector 904 may be parted at position 906 (FIG. 9C). Depending on the embodiment, coupling and decoupling can be electro-magnetic (on/off), and/or coupling and decoupling can be provided for by mechanically restraining the end effector and moving the motion components out of its magnetic field laterally.

Figure 10A:
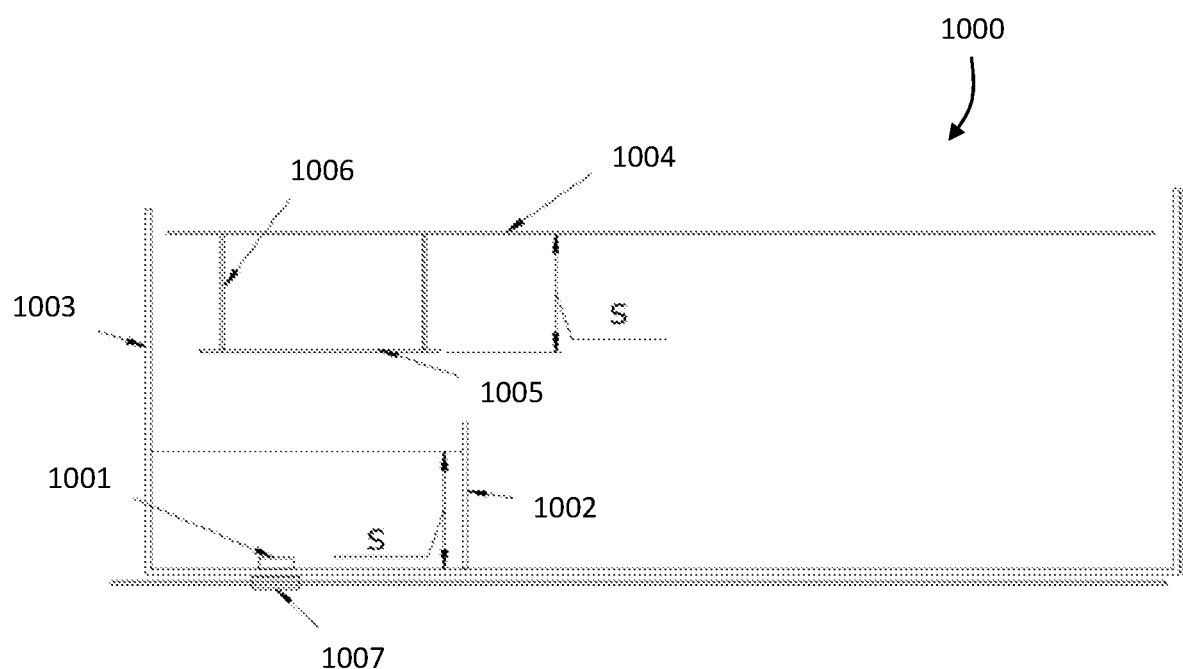
FIGS. 10A and 10B are schematic illustrations depicting a segmented printing space achieved with magnetic linkage, according to some embodiments.
Figure 10B:
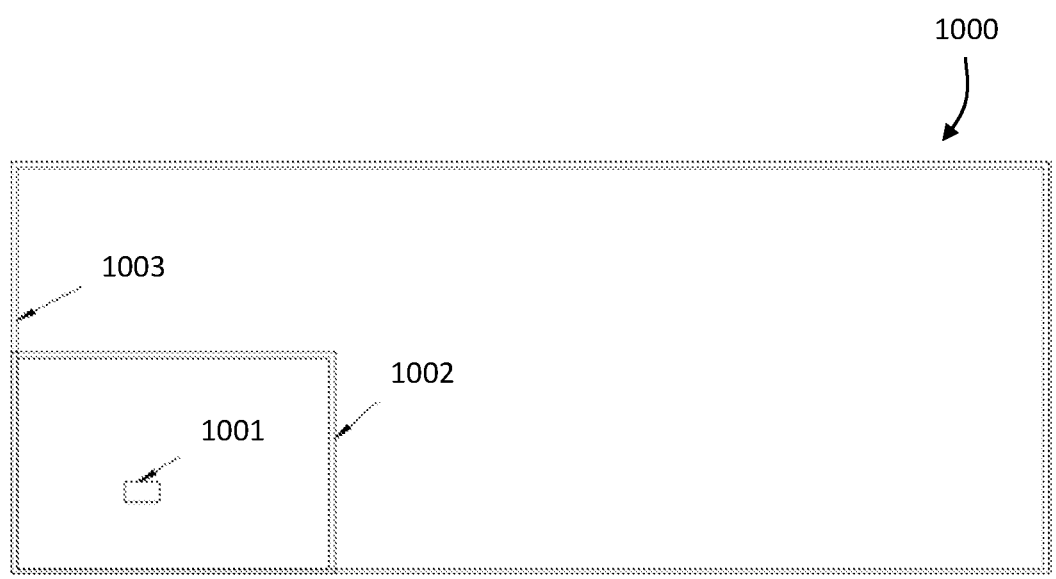

FIG. 10A and FIG. 10B depict an example of a system 1000 having a segmented printing space achieved with magnetic linkage. In this embodiment, the end effector 1001 can be contained within a segmented space 1002 of the greater container 1003 volume. Additionally, in this embodiment, the print bed 1004 has incorporated a smaller print bed 1005 attached via stand-offs 1006. The system 1000 includes motion components 1007. This allows a large vessel volume to be reduced or minimized for smaller jobs. This is a practical benefit when running the machine commercially because the entire tank doesn't need to be filled to fabricate a small part.

Figure 11A:
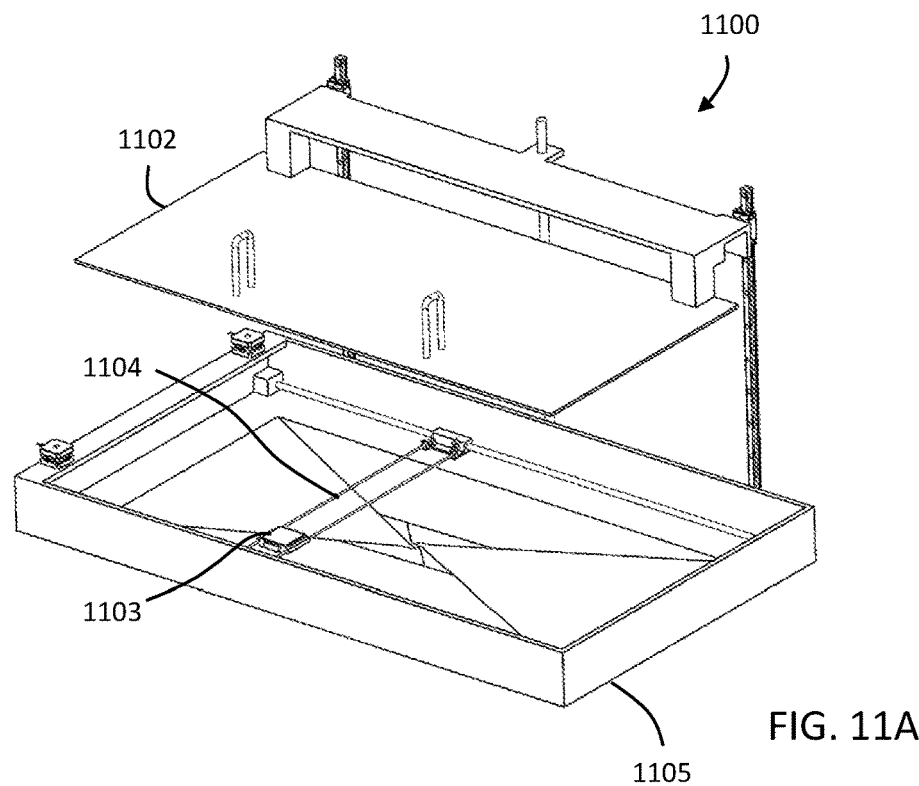
FIGS. 11A and 11B are perspective view depicting a mechanical implementation of the 3D printing device, according to some embodiments.
Figure 11B:
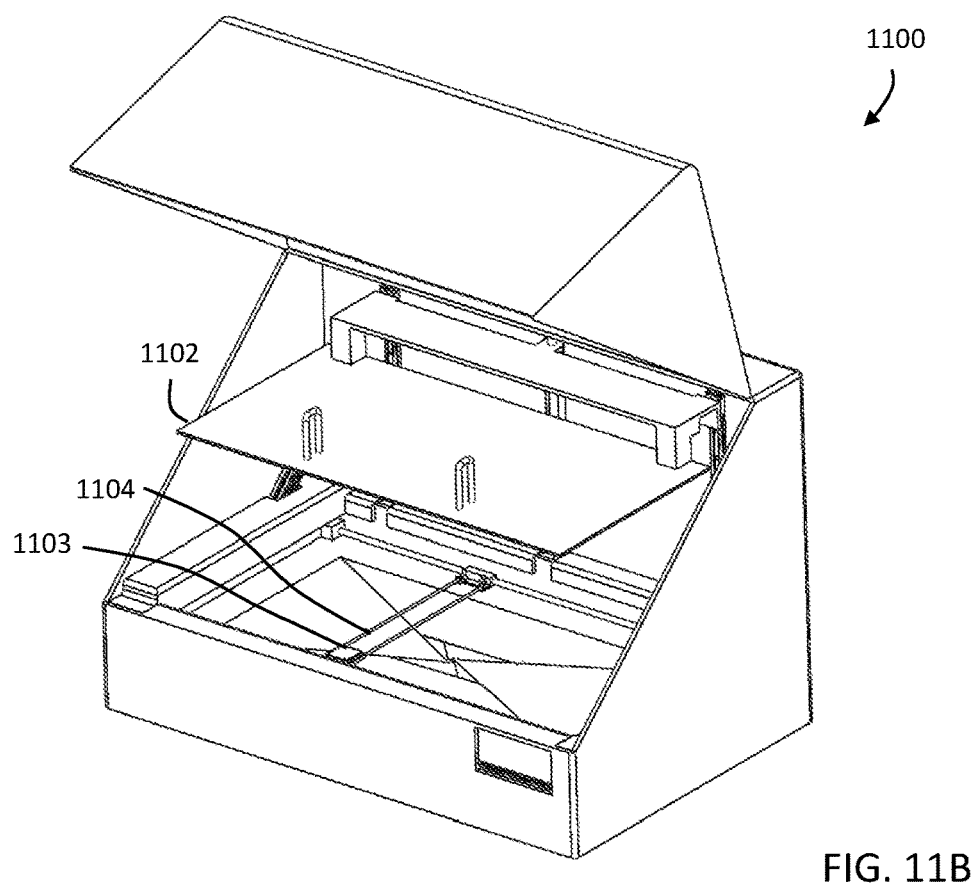

FIG. 11A and FIG. 11B depicts an example mechanical implementation of a system 1100, according to one or more embodiments. This embodiment shows a bottom up configuration with the light source 1103 positioned below the cured photopolymer which is formed on a movable print bed 1102. The end effector 1103 and motion components 1104 are positioned within the photopolymer container 1105. They can be made of suitable materials for such an application such as, by way of non-limiting example, aluminium, stainless steel, HDPE, UHMW-PE, and/or the like. Although various mechanical configurations can be used, in this example, a 'CoreXY' configuration is depicted for the purposes of illustration.

FIG. 12 depicts an assembly 1200 having an effector configuration where the light source 1201, within the end effector 1206, is powered by wireless means through the use of electromagnetic induction 1202,1203. The end effector 1206 resides inside the photopolymer vessel 1204 and the motion components 1205 reside outside of the vessel. The end effector 106 and motion components 1205 may be linked magnetically as described herein.

FIG. 13A, FIG. 13B and FIG. 13C depict a detail view of an end effector 1301 utilising a gas barrier as described herein. FIG. 13A notes the light source 1302, the light emission angle 1303, an orifice at one opening 1304 and a tapered profile 1305. The end effectors 1301 cylindrical shape 1306 is noted as well as a reflective coating/material 1307 along its inside walls. A hollow volume 1308 exists within the end effector 1301 which affords a light path 1309. Shown in FIG. 13B is a gas 1310 which forms a gas buffer 1311. The gas 1310 is delivered via a pipe 1312. Electrical power for the light source 1302 is provided by a wire 1313 entering at the top side of the end effector assembly.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various methods and/or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers/compute device and/or other processors to implement various aspects of the present disclosure as discussed above.

The terms "program" or "software" are used herein in a general sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure can be distributed in a modular fashion amongst a number of different compute devices/processors to implement various aspects of the disclosure.

Processor-executable instructions can be in many forms, such as program modules, executed by one or more compute devices, and can include routines, programs, objects, components, data structures, etc. that perform particular tasks or implement particular data types, and the functionality can be combined and/or distributed as appropriate for various embodiments.

Data structures can be stored in processor-readable media in a number of suitable forms. For simplicity of illustration, data structures may be shown to have fields that are related through location in the data structure. Such relationships can likewise be achieved by assigning storage for the fields with locations in a processor-readable medium that conveys relationship(s) between the fields. However, any suitable mechanism/tool can be used to establish a relationship between information in fields of a data structure, including through the use of pointers, tags or other mechanisms/tools that establish relationship between data elements.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The invention claimed is:

1. A system for continuous additive manufacturing of objects, the system comprising:
a container configured to receive a photopolymer;
a print bed disposed within the container, the print bed having a print surface normal oriented in a first direction;
a first end effector movably disposed within the container, the first end effector being movable in a second direction and a third direction, the third direction being perpendicular to the second direction, and the first direction being perpendicular to the second direction and third direction; and
a light source operably coupled to the first end effector, the light source being configured to emit electromagnetic radiation to selectively cure the photopolymer between the light source and the print bed, wherein a portion of the end effector containing the light source is submerged within the photopolymer during operation of the system;
wherein at least one of the print bed or the first end effector is laterally movable in the second direction and third direction relative to the other to perform continuous separation of cured polymer while also curing of the photopolymer on the print bed with the electromagnetic radiation, wherein the continuous separation releases or neutralizes a vacuum or low pressure area caused by shrinkage of the cured polymer and formed between the first end effector and the cured polymer.

2. The system of claim 1, wherein the first end effector includes a nonstick coating on an end of the end effector, the end being adjacent to the print bed.

3. The system of claim 2, wherein the nonstick coating is polydimethylsiloxane.

4. The system of claim 1, wherein the lateral movement applies a constant release force on the cured polymer.

5. The system of claim 4, wherein the release force is less than a release force needed when releasing a full layer of cured polymer.

6. The system of claim 1, further comprising a linear motion component magnetically coupled to the end effector.

7. The system of claim 6, further comprising an induction coil operably coupled to provide electrical power to the first end effector.

8. The system of claim 1, wherein the first end effector is configured to receive a gas, the gas forming a barrier on an end of the first end effector adjacent the print bed.

9. The system of claim 8, wherein the first end effector is configured to flow the gas to prevent an ingress of liquid photopolymer into a low pressure region caused by photopolymer shrinkage during curing.

10. The system of claim 1, wherein the print bed moves in a direction perpendicular to the first end effector.

11. The system of claim 1, further comprising a second end effector movably disposed within the container, wherein the first end effector and second end effector are selectively movable during operation of the system.

12. A method of continuous additive manufacturing of objects using the system of claim 1, the method comprising:
   disposing the end effector adjacent the print bed in the container having a photopolymer;
   activating the light source in the end effector to emit the electromagnetic radiation into an area between the end effector and the print bed to cure a portion of the photopolymer in the area;
   moving the end effector laterally relative to the print bed to define a cured layer;
   releasing the portion of the photopolymer as the end effector is moved laterally, wherein the releasing includes releasing a vacuum or neutralizing a low pressure area formed by polymer shrinkage with the end effector; and
   moving one of the end effector or the print bed in a direction perpendicular to an axis of the end effector when the cured layer is completed.

13. The method of claim 12, further comprising repeating the steps of activating the light source, moving the end effector laterally, and releasing the portion of the photopolymer after moving the end effector or the print bed.

14. The method of claim 13, wherein the end effector or print bed is moved in a direction perpendicular to the axis for a distance equal to or greater than a thickness of the cured layer.

15. The method of claim 12, further comprising applying a constant release force on the print bed during the lateral movement of the end effector.

16. The method of claim 12, further comprising flowing a gas into the end effector and forming a barrier on an end of the end effector adjacent the print bed.

17. The method of claim 16, further comprising:
   shrinking the portion of the photopolymer when the portion is cured; and
   flowing the gas to prevent ingress of liquid photopolymer into a low pressure region caused by the shrinking.

18. The method of claim 12, wherein the moving one of the end effector or the print bed includes moving the end effector relative to the print bed.

19. The method of claim 12, wherein the moving one of the end effector or the print bed includes moving the print bed relative to the end effector.

* * * * *